(12) United States Patent
Fukumoto et al.

(10) Patent No.: US 8,367,245 B2
(45) Date of Patent: Feb. 5, 2013

(54) NON-AQUEOUS ELECTROLYTE SECONDARY BATTERY

(75) Inventors: Yusuke Fukumoto, Osaka (JP); Kaoru Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 892 days.

(21) Appl. No.: 11/520,571

(22) Filed: Sep. 14, 2006

(65) Prior Publication Data

US 2010/0227207 A1    Sep. 9, 2010

(30) Foreign Application Priority Data

Sep. 14, 2005    (JP) ................................. 2005-266910

(51) Int. Cl.
*H01M 6/10* (2006.01)
(52) U.S. Cl. ........................................ 429/215; 429/224
(58) Field of Classification Search .................. 429/215, 429/224
See application file for complete search history.

(56) References Cited

U.S. PATENT DOCUMENTS

| | | | |
|---|---|---|---|
| 4,244,898 A * | 1/1981 | Bandyopadhyay et al. ..... | 264/43 |
| 6,376,128 B1 * | 4/2002 | Goto ............................. | 429/304 |
| 6,627,346 B1 * | 9/2003 | Kinouchi et al. ............... | 429/144 |
| 6,727,017 B1 * | 4/2004 | Chang et al. ................... | 429/144 |
| 2004/0166407 A1 * | 8/2004 | Nakajima et al. .............. | 429/217 |
| 2006/0181243 A1 | 8/2006 | Graves et al. | |
| 2006/0181424 A1 | 8/2006 | Graves et al. | |
| 2006/0183426 A1 | 8/2006 | Graves et al. | |
| 2006/0184376 A1 | 8/2006 | Graves et al. | |
| 2006/0185005 A1 | 8/2006 | Graves et al. | |
| 2006/0236373 A1 | 10/2006 | Graves et al. | |
| 2006/0240771 A1 | 10/2006 | Graves et al. | |

FOREIGN PATENT DOCUMENTS

| | | |
|---|---|---|
| JP | 61-206165 | 9/1986 |
| JP | 01-232663 | 9/1989 |
| JP | 10-245230 | 9/1998 |
| JP | 2000-357537 | 12/2000 |
| JP | 2003-142078 | 5/2003 |
| JP | 2003-249210 | 9/2003 |

OTHER PUBLICATIONS

Korean Office Action issued in Korean Patent Application No. KR 10-2006-0088496, mailed Jul. 30, 2007.
Korean Notice of Allowance, with English Translation, issued in Korean Patent Application No. 10-2006-0088496, dated on Jan. 18, 2008.

* cited by examiner

*Primary Examiner* — Jane Rhee
(74) *Attorney, Agent, or Firm* — McDermott Will & Emery LLP

(57) ABSTRACT

A non-aqueous electrolyte secondary battery having a high negative electrode energy density, good safety and high discharge characteristics is provided without damaging manufacturing facilities. The non-aqueous electrolyte secondary battery includes a positive electrode, a negative electrode, a porous heat-resistant layer interposed between the positive electrode and the negative electrode, and a non-aqueous electrolyte. The negative electrode comprises a negative electrode current collector and a negative electrode mixture layer on a surface of the negative electrode current collector, and the negative electrode mixture layer has an active material density of 1.5 g/ml to 1.8 g/ml. The porous heat-resistant layer is carried on the negative electrode, and the porous heat-resistant layer comprises magnesium oxide particles having a mean particle size of 0.5 μm to 2 μm.

6 Claims, 1 Drawing Sheet

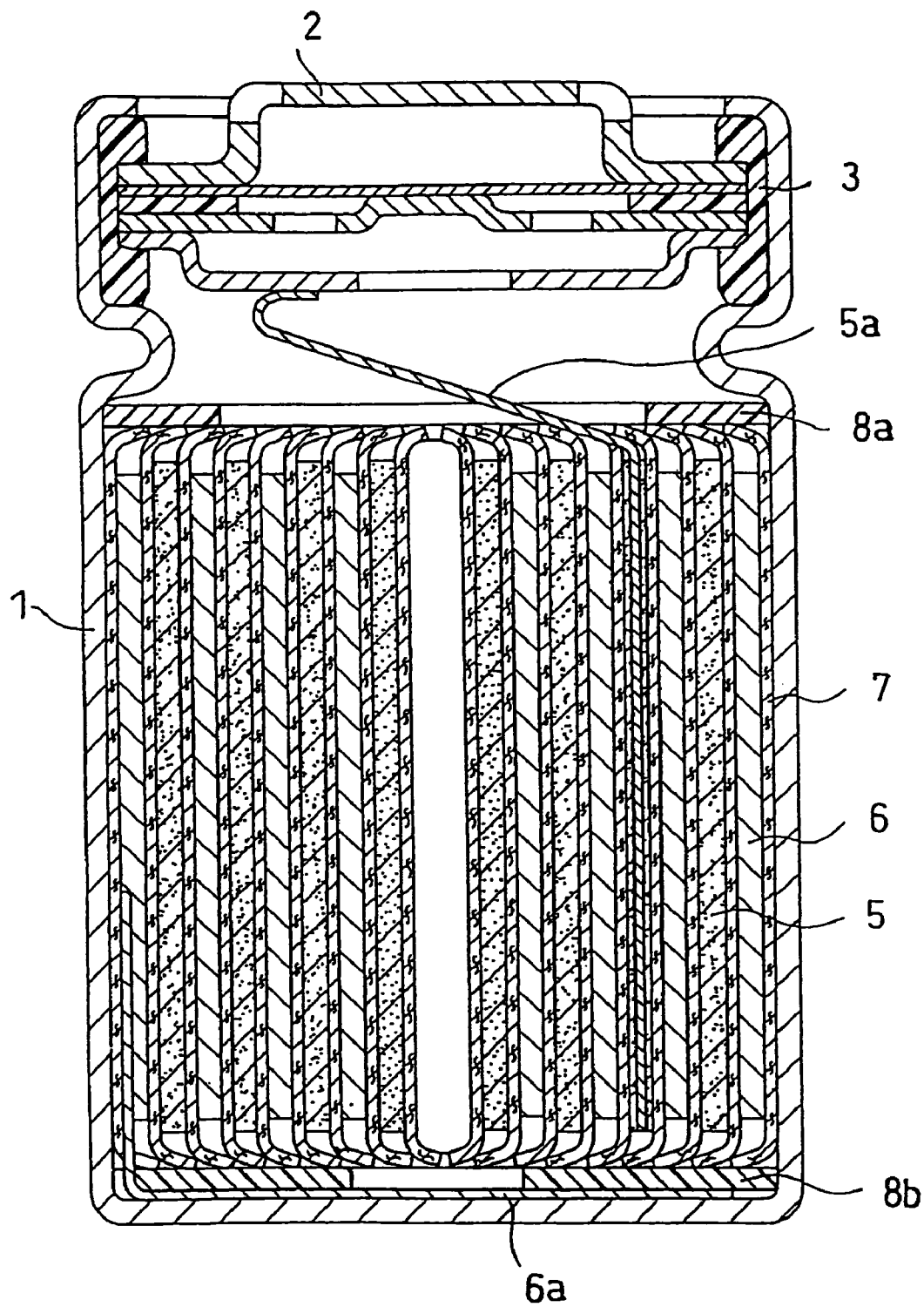

NON-AQUEOUS ELECTROLYTE SECONDARY BATTERY

TECHNICAL FIELD

The present invention relates to a non-aqueous electrolyte secondary battery including a negative electrode that carries a porous heat-resistant layer composed mainly of ceramic particles.

BACKGROUND OF THE INVENTION

Non-aqueous electrolyte secondary batteries, such as lithium ion secondary batteries, have a separator that electronically insulates the positive electrode from the negative electrode while holding an electrolyte. A porous film made of resin (i.e., porous resin film) is predominantly used as the separator, and polyolefin or other resin is used as a raw material of the porous resin film.

Such porous resin films deform at high temperatures. Therefore, under abnormal conditions where a battery becomes short-circuited and the temperature of the battery rises, the short-circuit may expand. Hence, it has been examined to form a porous heat-resistant layer that resists deformation even at high temperatures on an electrode. The porous heat-resistant layer is composed mainly of heat-resistant ceramic particles and therefore has a function of suppressing occurrence or expansion of short-circuits under abnormal conditions.

The ceramic particles of the porous heat-resistant layer are mainly aluminum oxide. Aluminum oxide does not contribute to battery reactions which occur in non-aqueous electrolyte secondary batteries. Also, aluminum oxide is highly heat-resistant and suited for controlling the pore size distribution of the porous heat-resistant layer.

Japanese Laid-Open Patent Publication No. 2003-142078 proposes using magnesium oxide as the ceramic particles. Magnesium oxide does not contribute to battery reactions occurring in non-aqueous electrolyte secondary batteries either, thus being stable.

The porous heat-resistant layer is formed on an electrode by using a slurry composed of a mixture of ceramic particles, a binder and a liquid component. After the slurry is applied onto the electrode, the liquid component needs to be removed by drying. However, the electrode has a current collector and an electrode mixture layer carried thereon, and the liquid component of the slurry permeates the electrode mixture layer before it is removed by drying. As a result, the thickness of the electrode mixture layer increases.

An increase in the thickness of the electrode mixture layer results in a decrease in the active material density. In consideration of the insertion of an electrode assembly composed of integrated positive and negative electrodes into a predetermined battery container (battery case), an increase in thickness needs to be considered in designing a battery. In this case, the energy density of the battery decreases. Also, even if a battery is carefully designed, it may be difficult to insert the electrode assembly into the battery container.

The final thickness of an electrode mixture layer may be limited by rolling the electrode mixture layer carried on a current collector with a strong pressure before forming a porous heat-resistant layer. However, excessive rolling causes the electrode mixture layer to separate from the current collector. Also, if an electrode with a porous heat-resistant layer is rolled, the porosity and pore size distribution of the porous heat-resistant layer are changed, so that the discharge characteristics are impeded. Further, since the ceramic particles of the porous heat-resistant layer damage the surfaces of reduction rolls, the life of manufacturing facilities is shortened.

BRIEF SUMMARY OF THE INVENTION

As described above, rolling an electrode with a porous heat-resistant layer causes various problems, and the present invention makes it possible to avoid any of these problems. The present invention proposes using magnesium oxide with a mean particle size of 2 μm or less as the ceramic particles. According to this proposal, it is possible to reduce the increased thickness of the negative electrode mixture layer without damaging the surfaces of reduction rolls and to provide a non-aqueous electrolyte secondary battery with good discharge characteristics.

The present invention provides a non-aqueous electrolyte secondary battery including a positive electrode, a negative electrode, a porous heat-resistant layer interposed between the positive electrode and the negative electrode, and a non-aqueous electrolyte. The negative electrode comprises a negative electrode current collector and a negative electrode mixture layer on a surface of the negative electrode current collector, and the negative electrode mixture layer has an active material density of 1.5 g/ml to 1.8 g/ml. The porous heat-resistant layer is carried on the negative electrode, and the porous heat-resistant layer contains magnesium oxide particles having a mean particle size (volume basis median diameter: D50) of 0.5 μm to 2 μm.

When a separator is provided between the positive electrode and the negative electrode, the porous heat-resistant layer preferably has a thickness of 1 μm to 5 μm.

When a separator is not provided between the positive electrode and the negative electrode, the porous heat-resistant layer preferably has a thickness of 2 μm to 15 μm.

The magnesium oxide preferably has a BET specific surface area of 3 $m^2$/g to 15 $m^2$/g.

The porous heat-resistant layer preferably contains 1 to 5 parts by weight of a binder per 100 parts by weight of the magnesium oxide particles.

The porous heat-resistant layer preferably has a porosity of 30% to 70%.

According to the present invention, the energy density of the negative electrode can be heightened without damaging the manufacturing facilities. Specifically, the active material density of the negative electrode mixture layer can be controlled at 1.5 g/ml to 1.8 g/ml and, in addition, the life of the manufacturing facilities can be prolonged. According to the present invention, degradation of discharge characteristics is also suppressed.

Magnesium oxide hardly damages the surfaces of reduction rolls, and this is probably because magnesium oxide has low hardness. However, when rolled, magnesium oxide particles become easily cracked or deformed, thereby resulting in large changes in the porosity and pore size distribution of the porous heat-resistant layer.

However, in the case of using small magnesium oxide particles with a mean particle size of 2 μm or less, the load applied by rolling is distributed among more small particles, so that the particles are prevented from becoming cracked or deformed. That is, it is believed that even if a porous heat-resistant layer containing magnesium oxide with a mean particle size of 2 μm or less is rolled, changes in porosity and pore size distribution are suppressed. Therefore, the degradation of discharge characteristics is also suppressed.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 1 is a longitudinal sectional view of a cylindrical lithium ion secondary battery.

DETAILED DESCRIPTION OF THE INVENTION

The non-aqueous electrolyte secondary battery of the present invention includes a positive electrode, a negative electrode, a porous heat-resistant layer interposed between the positive electrode and the negative electrode, and a non-aqueous electrolyte. The positive electrode and the non-aqueous electrolyte are not particularly limited. Thus, various positive electrodes and various non-aqueous electrolytes that have been proposed for non-aqueous electrolyte secondary batteries may be used in the present invention. Also, the negative electrode is not particularly limited provided that the following requirements are satisfied. Hence, various negative electrodes that have been proposed for non-aqueous electrolyte secondary batteries may be used in the present invention as long as they satisfy the following requirements.

The porous heat-resistant layer functions similarly to a separator comprising a porous film made of resin, but the structure of the porous heat-resistant layer is significantly different from that of a porous film made of resin (i.e., porous resin film) obtained by drawing a resin sheet. The porous heat-resistant layer is composed of ceramic particles that are held together by a resin binder, so the tensile strength of the porous heat-resistant layer in the plane direction thereof is lower than that of the porous resin film. However, even when the porous heat-resistant layer is exposed to high temperatures, it does not shrink due to heat unlike the porous resin film. Therefore, the porous heat-resistant layer has a function of preventing expansion of a short-circuit under abnormal conditions and thus enhancing battery safety. It should be noted that the non-aqueous electrolyte secondary battery of the present invention may further include a separator comprising a porous resin film in addition to the porous heat-resistant layer.

The porous heat-resistant layer is carried on at least a part of a surface of the negative electrode. Generally, the negative electrode is larger in active material carrying area than the positive electrode. It is thus preferred that the porous heat-resistant layer be carried on the negative electrode.

The porous heat-resistant layer is carried on the negative electrode, for example, in such a manner as to cover the negative electrode mixture layer. Alternatively, a portion of the negative electrode that is most likely to become short-circuited is selected, and the porous heat-resistant layer is carried on the selected portion. Alternatively, the porous heat-resistant layer is partially carried on the surface of the negative electrode mixture layer opposing the positive electrode mixture layer, in which case the distribution of the porous heat-resistant layer may be varied. Alternatively, the porous heat-resistant layer is carried on the entire surface of the negative electrode mixture layer opposing the positive electrode mixture layer.

The negative electrode comprises a negative electrode current collector and a negative electrode mixture layer on a surface of the negative electrode current collector. The form of the negative electrode current collector and the negative electrode mixture layer is not particularly limited. Typically, a negative electrode mixture layer in the form of a thin film is carried on one face or both faces of a negative electrode current collector in the form of a sheet or a belt.

The negative electrode current collector in the form of a sheet or belt is made of, for example, copper or a copper alloy. In some cases, the negative electrode current collector may be subjected to a process such as perforation, mesh process, lath process, or surface treatment. Exemplary surface treatment processes include plating, etching, and coating.

The negative electrode mixture layer contains a negative electrode active material. The negative electrode active material may be a carbon material, a simple metal, an alloy, a metal compound, or the like. Exemplary carbon materials include natural graphites, artificial graphites, non-graphitizable carbon, graphitizable carbon, and mesophase carbon. Exemplary simple metals include silicon and tin. Exemplary alloys include silicon alloys (Si—Ti alloy, Si—Cu alloy, etc). Exemplary metal compounds include silicon oxides ($SiO_x$ where $0<x<2$) and tin oxides ($SnO$, $SnO_2$). They may be used singly or in combination of two or more of them.

Particularly preferable examples of negative electrode active materials include natural graphites, artificial graphite, non-graphitizable carbon, and graphitizable carbon. The mean particle size (volume basis median diameter: D50) thereof is desirably 5 μm to 35 μm, and more desirably 10 μm to 25 μm. The mean particle size can be determined, for example, from volume basis particle size distribution as determined by using a laser diffraction particle size distribution analyzer. The mean particle size corresponds to median diameter: D50 (50% accumulation) in volume basis particle size distribution. The mean particle size of magnesium oxide particles contained in the porous heat-resistant layer, or other particles, can be determined in the same manner.

The negative electrode mixture layer preferably contains 0.5 to 5 parts by weight of a binder per 100 parts by weight of the negative electrode active material. It is more preferred that the binder content be 0.8 to 2 parts by weight per 100 parts by weight of the negative electrode active material.

Exemplary binders to be contained in the negative electrode mixture layer include fluorocarbon resins, such as polytetrafluoroethylene (PTFE) and polyvinylidene fluoride (PVDF), and rubber particles. Among them, rubber particles are particularly preferred.

Exemplary rubber particles include styrene butadiene rubber (SBR) and modified styrene butadiene rubber (modified SBR). Among them, modified SBR is particularly preferred.

Modified SBR desirably has at least one selected from the group consisting of an acrylonitrile unit, an acrylate unit, an acrylic acid unit, a methacrylate unit, and a mathacrylic acid unit, and it is particularly preferred to contain an acrylonitrile unit, an acrylate unit and an acrylic acid unit. The acrylate unit is preferably 2-ethylhexyl acrylate or the like. A commercially available, preferable binder is BM-400B manufactured by Zeon Corporation.

When modified SBR has an acrylonitrile unit, an acrylate unit and an acrylic acid unit, the absorption intensity based on C═O stretching vibration in an absorption spectrum obtained by FT-IR measurement is preferably 3 to 50 times the absorption intensity based on C≡N stretching vibration.

The negative electrode mixture layer can further contain 0.5 to 3 parts by weight of a thickener per 100 parts by weight of the negative electrode active material. Exemplary thickeners include carboxymethyl cellulose (CMC), methyl cellulose (MC), polyvinyl alcohol, polyethylene oxide (PEO), and polyacrylic acid (PAN). Among them, CMC is particularly preferred.

The negative electrode mixture layer can further contain a small amount of a conductive agent. Various carbon blacks can be used as the conductive agent.

According to a conventional method for producing a negative electrode, first, a negative electrode mixture past is prepared. The negative electrode mixture paste is prepared by mixing a negative electrode mixture with a liquid component (dispersion medium). The negative electrode mixture contains a negative electrode active material as an essential component and optional components such as a binder, a conductive agent, and a thickener.

The negative electrode mixture paste is applied onto one face or both faces of a negative electrode current collector, followed by drying. At this time, the negative electrode mixture paste is not applied to a part of the negative electrode current collector, and this non-applied part is utilized for welding a negative electrode lead thereto. The dried negative electrode mixture on the negative electrode current collector is rolled with reduction rolls, so that a negative electrode mixture layer with a controlled thickness is formed. The active material density of the negative electrode mixture layer is 1.5 g/ml to 1.8 g/ml. If the active material density exceeds 1.8 g/ml, the negative electrode mixture layer may separate from the negative electrode current collector.

The active material density of the negative electrode mixture layer is represented by the weight of the negative electrode active material contained in 1 ml (1 cm$^3$) of the negative electrode mixture layer. Thus, the active material density can be calculated from the weight of the negative electrode mixture layer per ml and the weight ratio of the negative electrode active material relative to the negative electrode mixture.

The porous heat-resistant layer contains magnesium oxide particles. The mean particle size (volume basis median diameter: D50) of the magnesium oxide particles is 0.5 μm to 2 μm, preferably 0.8 μm to 1.5 μm. If the mean particle size of the magnesium oxide particles is less than 0.5 μm, the porosity of the porous heat-resistant layer becomes too high and the mechanical strength of the porous heat-resistant layer decreases, thereby resulting in degradation of safety. On the other hand, if the mean particle size of the magnesium oxide particles exceeds 2 μm, rolling such a porous heat-resistant layer causes a sharp degradation of discharge characteristics.

Even when the mean particle size of the magnesium oxide particles exceeds 2 μm, if the porous heat-resistant layer is not rolled, the discharge characteristics do not degrade. On the other hand, when the porous heat-resistant layer is rolled, relatively large magnesium oxide particles are apt to become cracked or deformed. As a result, the porosity and pore size distribution of the porous heat-resistant layer are changed, thereby resulting in degradation of discharge characteristics. It is believed that the degree of cracking or deformation of the particles becomes evident when the mean particle size of the magnesium oxide particles exceeds 2 μm. This is probably because when the particle size is large, the load applied by rolling is not sufficiently dispersed. On the other hand, in the case of magnesium oxide particles with a mean particle size of 2 μm or less, the load applied by rolling is distributed among more particles. This is probably the reason why cracking and deformation are suppressed and sharp degradation of discharge characteristics are avoided.

Rolling the porous heat-resistant layer results in a sharp degradation of discharge characteristics, and this tendency is believed to be a phenomenon unique to magnesium oxide particles with a mean particle size of more than 2 μm. For example, in the case of using aluminum oxide particles with a mean particle size of more than 2 μm in place of magnesium oxide, rolling such a porous heat-resistant layer does not result in a sharp degradation of discharge characteristics. This difference is ascribed to the difference in hardness between magnesium oxide and aluminum oxide. It is believed that magnesium oxide is inherently susceptible to cracking and deformation since it has low hardness, while aluminum oxide resists cracking or deformation regardless of the particle size because it has high hardness.

The BET specific surface area of the magnesium oxide particles is preferably 3 m$^2$/g to 15 m$^2$/g, and more preferably 3 m$^2$/g to 12 m$^2$/g. In the case of magnesium oxide particles with a mean particle size of 2 μm or less, it is practically difficult to make their BET specific surface area to less than 3 m$^2$/g. If the BET specific surface area exceeds 15 m$^2$/g, the mean particle size of the magnesium oxide particles usually becomes smaller than 0.5 μm. Thus, the porosity of the porous heat-resistant layer becomes high, and it may be difficult to ensure safety. Also, if the BET specific surface area becomes too large, the amount of binder becomes relatively small, so that the strength of the porous heat-resistant layer may deteriorate.

The porous heat-resistant layer preferably contains 1 to 5 parts by weight of a binder per 100 parts by weight of the magnesium oxide particles. The binder content is more preferably 2 to 4 parts by weight, and particularly preferably 2.2 to 4 parts by weight per 100 parts by weight of the magnesium oxide particles. If the binder content is less than 1 part by weight per 100 parts by weight of the magnesium oxide particles, the strength of the porous heat-resistant layer may not be sufficient. On the other hand, if the binder content exceeds 5 parts by weight per 100 parts by weight of the magnesium oxide particles, the discharge characteristics may degrade. However, the preferable binder content varies depending on the thickness of the porous heat-resistant layer. The thinner the porous heat-resistant layer is, the less the binder content affects the discharge characteristics.

While the binder to be contained in the porous heat-resistant layer is not particularly limited, for example, any of the resin materials described as the binders to be contained in the negative electrode mixture layer may be used. Among them, for example, polyvinylidene fluoride (PVDF) and rubber particles are suitable as the binders to be contained in the porous heat-resistant layer.

Rubber particles and PVDF have a suitable degree of elasticity. A suitably elastic binder is desirably present more abundantly in the porous heat-resistant layer than the negative electrode mixture layer. This is because the negative electrode mixture layer absorbs the stress applied by rolling and therefore the stress applied to the porous heat-resistant layer is reduced. Thus, changes in the porosity and pore size distribution of the porous heat-resistant layer are significantly suppressed.

When the porous heat-resistant layer is formed on the negative electrode, first, a slurry for forming a porous heat-resistant layer (i.e., heat-resistant layer slurry) is prepared. The heat-resistant layer slurry is prepared by mixing magnesium oxide particles with a liquid component (dispersion medium). The heat-resistant layer slurry may contain optional components such as a binder and a thickener in addition to the magnesium oxide particles. As the liquid component, for example, an organic solvent such as N-methyl-2-pyrrolidone or cyclohexanone, or water is used, but there is no particular limitation.

The device for mixing the magnesium oxide particles with the liquid component is desirably a medialess dispersing device. Magnesium oxide, which has low hardness, tends to become cracked or deformed when subjected to shearing force, but the use of a medialess dispersing device makes it possible to suppress cracking or deformation of particles.

The heat-resistant layer slurry is applied to at least a part of the negative electrode. At this time, the liquid component contained in the heat-resistant layer slurry permeates the negative electrode mixture layer, so that the thickness of the negative electrode mixture layer increases. As a result, the active material density of the negative electrode mixture layer immediately after the removal of the liquid component by drying decreases to 1.45 g/ml to 1.70 g/ml. The higher active material density the negative electrode mixture layer has before its thickness increases, the greater the rate of decrease of active material density becomes. However, in the present invention, the negative electrode with the thickened negative electrode mixture layer can be rolled again.

A conventional non-aqueous electrolyte secondary battery is produced by using a negative electrode whose thickness has been increased and whose active material density has been reduced. This is to avoid changes in the porosity and pore size distribution of the porous heat-resistant layer and to avoid damage of the surfaces of the reduction rolls. On the other hand, according to the present invention, since the magnesium oxide particles with a mean particle size of 2 μm or less are used, changes in the porosity and pore size distribution of the porous heat-resistant layer are suppressed and the surfaces of the reduction rolls are prevented from becoming damaged.

It should be noted that in the case of using other ceramic particles than the magnesium oxide particles, for example, aluminum oxide particles, if the negative electrode is re-rolled, the surfaces of the reduction rolls are damaged regardless of their mean particle size, so that the life of the manufacturing facilities is shortened.

Due to the re-rolling, the thickness of the negative electrode mixture layer returns to the thickness before the formation of the porous heat-resistant layer on the negative electrode. At the same time, the active material density of the negative electrode mixture layer is controlled at 1.5 g/ml to 1.8 g/ml, preferably 1.7 g/ml to 1.8 g/ml, and more preferably 1.75 g/ml to 1.8 g/ml. According to the present invention, it is therefore possible to provide batteries having higher energy density than conventional batteries with a porous heat-resistant layer.

When the non-aqueous electrolyte secondary battery includes a separator comprising a porous resin film, the thickness of the porous heat-resistant layer after the re-rolling of the negative electrode is preferably 1 μm to 5 μm, and more preferably 1 μm to 4 μm. If the thickness of the porous heat-resistant layer is less than 1 μm, the porous heat-resistant layer may not produce a sufficient effect in improving safety. On the other hand, if the thickness of the porous heat-resistant layer exceeds 5 μm, the discharge characteristics may degrade relatively remarkably. This is probably because the increased thickness of the porous heat-resistant layer leads to an increase in resistance. It should be noted that when the thickness of the porous heat-resistant layer is 2 μm or less, the porosity hardly changes due to re-rolling. The thickness of the porous heat-resistant layer is desirably determined by measuring the weight of the porous heat-resistant layer by fluorescence X-rays and converting the measured weight into thickness by using a calibration curve.

When the non-aqueous electrolyte secondary battery does not include a separator comprising a porous resin film, the thickness of the porous heat-resistant layer after the re-rolling of the negative electrode is preferably 2 μm to 15 μm, and more preferably 5 μm to 12 μm. In this case, the porous heat-resistant layer serves as the separator.

From the standpoint of ensuring good discharge characteristics, the porosity of the porous heat-resistant layer is preferably 30 to 70%, and more preferably 40 to 55%. In the case of using magnesium oxide particles with a mean particle size of 2 μm or less, it is easy to make the porosity to 30% or more even after the re-rolling of the negative electrode, and it is relatively easy to make the porosity to 40% or more. On the other hand, in the case of using magnesium oxide particles with a mean particle size of more than 2 μm, it is difficult to make the porosity to 30% or more after the re-rolling of the negative electrode.

The porosity (P) of the porous heat-resistant layer can be calculated from the true volume Vt of the porous heat-resistant layer carried on the re-rolled negative electrode and the apparent volume Va of the porous heat-resistant layer determined from the area (S) and thickness (T) thereof (i.e., S×T) as follows: $P(\%)=100(Va-Vt)/Va=100(ST-Vt)/ST$. It can also be determined by mercury porosimetry. In the case of using mercury porosimetry, the porosity is calculated, for example, from the difference in pore size distribution of the negative electrode before and after the porous heat-resistant layer is carried thereon.

The porous heat-resistant layer may contain other ceramic particles than the magnesium oxide particles in an amount of not more than 50% by weight of the total ceramic particles. However, in order that the effects of the present invention may not be significantly impaired, it is preferred that other ceramic particles than the magnesium oxide particles constitute not more than 25% by weight of the total ceramic particles. As long as the ceramic particles are composed mainly of magnesium oxide particles, the effects of the present invention are not significantly impaired.

The positive electrode comprises, for example, a positive electrode current collector and a positive electrode mixture layer carried on a surface of the positive electrode current collector. The form of the positive electrode current collector and the positive electrode mixture layer is not particularly limited. Typically, a positive electrode mixture layer in the form of a thin film is carried on one face or both faces of a positive electrode current collector in the form of a sheet or a belt.

The positive electrode current collector in the form of a sheet or belt is made of, for example, aluminum or an aluminum alloy. In some cases, the positive electrode current collector may be subjected to a process such as perforation, mesh process, lath process, or surface treatment. Exemplary surface treatment processes include plating, etching, and coating. The thickness of the positive electrode current collector is, for example, 10 μm to 60 μm.

The positive electrode mixture layer contains a positive electrode active material. For example, a lithium-containing oxide capable of absorbing and desorbing lithium ions is used as the positive electrode active material. Such lithium-containing oxides include, for example, composite metal oxides containing lithium and at least one transition metal selected from cobalt, manganese, nickel, chromium, iron, and vanadium. Among them, those with part of the transition metal being replaced with Al, Mg, Zn, or Ca are desirable.

Preferable composite metal oxides include $Li_xCoO_2$, $Li_xMnO_2$, $Li_xNiO_2$, $Li_xCrO_2$, $\alpha Li_xFeO_2$, $Li_xVO_2$, $Li_xCO_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (where M is at least one selected from the group consisting of Na, Mg, Sc, Y, Mn, Fe, Co, Ni, Cu, Zn, Al, Cr, Pb, Sb, and B, $x=0$ to 1.2, $y=0$ to 0.9, and $z=2$ to 2.3), transition metal chalcogenide, lithiated vanadium oxides, and lithiated niobium oxides. They may be used singly or in combination of two or more of them. In the above chemical formulae, the value x increases/decreases due to charge/discharge. The mean particle size of the positive electrode active material is preferably 1 µm to 30 µm.

The positive electrode mixture layer may contain a binder, a conductive agent, etc. As the binder and conductive agent, for example, any of the materials described as the binders or conductive agents to be contained in the negative electrode mixture layer may be used.

According to a conventional method for producing a positive electrode, first, a positive electrode mixture past is prepared. The positive electrode mixture paste is prepared by mixing a positive electrode mixture with a liquid component (dispersion medium). The positive electrode mixture contains a positive electrode active material as an essential component and optional components such as a binder and a conductive agent.

The positive electrode mixture paste is applied onto one face or both faces of a positive electrode current collector, followed by drying. At this time, the positive electrode mixture paste is not applied to a part of the positive electrode current collector, and this non-applied part is utilized for welding a positive electrode lead thereto. The dried positive electrode mixture on the positive electrode current collector is rolled with reduction rolls, so that a positive electrode mixture layer with a controlled thickness is formed.

A preferable non-aqueous electrolyte comprises a non-aqueous solvent and a lithium salt dissolved therein. While the amount of lithium salt dissolved in the non-aqueous electrolyte is not particularly limited, the lithium salt concentration is preferably 0.2 to 2 mol/L, and more preferably 0.5 to 1.5 mol/L.

Exemplary non-aqueous solvents include: cyclic carbonates such as ethylene carbonate (EC), propylene carbonate (PC), and butylene carbonate (BC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethyl sulfoxide, 1,3-dioxolane, formamide, acetamide, dimethylformamide, dioxolane, acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methyl-2-pyrrolidone. While they may be used singly, it is preferred to use them in combination of two or more of them. Among them, solvent mixtures of a cyclic carbonate and a chain carbonate or solvent mixtures of a cyclic carbonate, a chain carbonate and an aliphatic carboxylic acid ester are preferred.

Exemplary lithium salts to be dissolved in the non-aqueous solvent include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiBr, LiI, chloroborane lithium, lithium tetraphenylborate, and lithium imide salts. They may be used singly or in combination of two or more of them, but it is preferred to use at least $LiPF_6$.

The non-aqueous electrolyte may contain various additives in order to improve the charge/discharge characteristics of the battery. It is preferred to use, for example, at least one selected from the group consisting of vinylene carbonate, vinyl ethylene carbonate and fluorobenzene. Other additives that may be used include triethyl phosphite, triethanolamine, cyclic ethers, ethylene diamine, n-glyme, pyridine, triamide hexaphosphate, nitro benzene derivatives, crownethers, quaternary ammonium salts, and ethylene glycol dialkyl ether.

The separator comprising a porous resin film is preferably made of polymers such as polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers (polyethylene oxide and polypropylene oxide), cellulose (carboxymethyl cellulose and hydroxypropyl cellulose), poly(meth)acrylic acid, and poly(meth)acrylic acid ester. A multi-layer film composed of a plurality of porous films is also preferably used. Among them, a monolayer or multilayer porous film comprising polyethylene, polypropylene, polyvinylidene fluoride, or the like is preferred. The thickness of the porous resin film is preferably 10 µm to 30 µm.

The present invention is hereinafter described specifically by way of Examples. These Examples, however, are not to be construed as limiting in any way the present invention.

Example 1

(i) Preparation of Positive Electrode

A positive electrode mixture paste was prepared by stirring 100 parts by weight of lithium cobaltate with a mean particle size of 10 µm serving as a positive electrode active material, 4 parts by weight of polyvinylidene fluoride (PVDF) (solid content of #1320 available from Kureha Corporation) as a binder, 3 parts by weight of acetylene black as a conductive agent, and a suitable amount of N-methyl-2-pyrrolidone (NMP) as a dispersion medium by means of a double-arm kneader. The positive electrode mixture paste was applied onto both sides of a belt-like positive electrode current collector comprising a 15-µm-thick aluminum foil. The applied positive electrode mixture paste was dried and rolled with reduction rolls to form a positive electrode mixture layer. The total thickness of the positive electrode current collector and the positive electrode mixture layers on both sides thereof was 160 µM. The resultant electrode plate was cut to a width such that it could be inserted into a battery case of the cylindrical-type 18650. In this way, a positive electrode was produced. The active material density of the positive electrode mixture layers was 3.6 g/ml.

(ii) Preparation of Negative Electrode

A negative electrode mixture paste was prepared by stirring 100 parts by weight of artificial graphite with a mean particle size of 20 µm serving as a negative electrode active material, 1 part by weight of modified SBR (solid content of BM-400B available from Zeon Corporation) as a binder, 1 part by weight of carboxymethyl cellulose (CMC) as a thickener, and a suitable amount of water as a dispersion medium by means of a double-arm kneader. The negative electrode mixture paste was applied onto both sides of a belt-like negative electrode current collector comprising a 10-µm-thick copper foil. The applied negative electrode mixture paste was dried and rolled with reduction rolls to form a negative electrode mixture layer. The total thickness of the negative electrode current collector and the negative electrode mixture layers on both sides thereof was 180 µm (the thickness of the electrode mixture layer was 85 µm per one side). The resultant electrode plate was cut to a width such that it could be inserted into the battery case of the cylindrical-type 18650. In this way, a negative electrode was obtained. The active material density of the negative electrode mixture layers was 1.8 g/ml.

(iii) Formation of Porous Heat-Resistant Layer

A slurry for forming a porous heat-resistant layer was prepared by stirring 100 parts by weight of magnesium oxide particles with a mean particle size of 1.0 μm and a BET specific surface area of 11.5 m²/g, 3 parts by weight of polyvinylidene fluoride (PVDF) serving as a binder, and a suitable amount of NMP as a dispersion medium by means of a media-less dispersing device (Clearmix available from M TECHNIQUE Co., Ltd). The heat-resistant layer slurry was applied onto the negative electrode, so that the surface of the negative electrode mixture layer was covered with the heat-resistant layer slurry. Thereafter, the applied heat-resistant layer slurry was dried to form a porous heat-resistant layer.

The mean particle size was measured by using a laser diffraction particle size distribution analyzer (Microtrac HRA available from Nikkiso Co., Ltd). The BET specific surface area was measured by multipoint analysis using nitrogen as the adsorbate by using ASAP2010 (available from Micromeritics Instrument Corporation, Shimadzu Corporation).

The thickness of the porous heat-resistant layer was 3 μm. This thickness was determined by measuring the weight of the porous heat-resistant layer by means of a fluorescence X-ray analyzer (available from RIGAKU Corporation) and converting the measured weight to thickness by using a calibration curve.

Due to the application of the heat-resistant layer slurry, the active material density of the negative electrode mixture layer was decreased to 1.7 g/ml.

(iv) Re-Rolling of Negative Electrode

The negative electrode with the porous heat-resistant layer carried thereon was re-rolled with reduction rolls, so that the total thickness of the negative electrode current collector and the negative electrode mixture layers on both sides thereof was adjusted to 180 μm. As a result, the active material density of the negative electrode mixture layers returned to 1.8 g/ml. The thickness of the porous heat-resistant layer was 3 μm.

A sample of 5 cm×5 cm was cut out from the center of the re-rolled negative electrode, and the weight of the sample was measured. The weight of the porous heat-resistant layer carried on the sample was determined by subtracting the weights of the negative electrode current collector and the negative electrode mixture layers, which had been determined in advance, from the weight of the sample. Also, the true volume Vt of the porous heat-resistant layer carried on the sample was calculated from the true density of the magnesium oxide particles and the true density of the polyvinylidene fluoride binder. Further, the apparent volume Va of the porous heat-resistant layer carried on the sample was determined from the size of the sample and the thickness of the porous heat-resistant layer. From the true volume Vt and the apparent volume Va thus obtained, the porosity P of the porous heat-resistant layer was determined to be 48% (P(%)=100(Va−Vt)/Va).

(v) Fabrication of Battery

Referring now to FIG. 1, fabrication of a battery is described. A cylindrical lithium ion secondary battery as illustrated in FIG. 1 was fabricated.

First, a nickel positive electrode lead 5a and a nickel negative electrode lead 6a were attached to a positive electrode 5 and a negative electrode 6 that were prepared in the above manner, respectively. The positive electrode 5 and the negative electrode 6 were wound together with a separator 7 interposed therebetween, to form an electrode assembly. The separator 7 used was a 20-μm-thick porous polypropylene film (porous resin film). This electrode assembly was inserted in a battery case 1 of the cylindrical-type 18650 (cylindrical metal can with a bottom having a diameter of 18 mm and a height of 65 mm). An upper insulator plate 8a was fitted to the upper face of the electrode assembly, and a lower insulator plate 8b was fitted to the lower face thereof. Thereafter, a non-aqueous electrolyte was injected into the battery case 1.

The non-aqueous electrolyte used was prepared by dissolving $LiPF_6$ at a concentration of 1 mol/liter in a solvent mixture of ethylene carbonate (EC) and ethyl methyl carbonate (EMC) in a weight ratio of 1:3.

After the injection of the non-aqueous electrolyte, the opening of the battery case 1 was sealed with a sealing plate 2 around which an insulating gasket 3 was fitted. Before the sealing, the sealing plate 2 and the positive electrode lead 5a were brought into conduction. In this way, a lithium ion secondary battery with a nominal capacity of 2 Ah was completed.

Example 2

A lithium ion secondary battery was produced in the same manner as in Example 1 except that the mean particle size of the magnesium oxide particles was changed to 0.5 μm (BET specific surface area: 14.8 m²/g).

Example 3

A lithium ion secondary battery was produced in the same manner as in Example 1 except that the mean particle size of the magnesium oxide particles was changed to 1.5 μm (BET specific surface area: 8.6 m²/g).

Example 4

A lithium ion secondary battery was produced in the same manner as in Example 1 except that the mean particle size of the magnesium oxide particles was changed to 2 μm (BET specific surface area: 3.5 m²/g).

Comparative Example 1

A lithium ion secondary battery was produced in the same manner as in Example 1 except that the mean particle size of the magnesium oxide particles was changed to 2.5 μm (BET specific surface area: 2.7 m²/g).

Comparative Example 2

A lithium ion secondary battery was produced in the same manner as in Example 1 except that the mean particle size of the magnesium oxide particles was changed to 3 μm (BET specific surface area: 2.5 m²/g).

Comparative Example 3

A lithium ion secondary battery was produced in the same manner as in Example 1 except that the mean particle size of the magnesium oxide particles was changed to 2.5 μm and that the thickness of the porous heat-resistant layer after the re-rolling of the negative electrode was changed to 7.5 μm.

Comparative Example 4

A lithium ion secondary battery was produced in the same manner as in Example 1 except that the mean particle size of the magnesium oxide particles was changed to 3 μm and that the thickness of the porous heat-resistant layer after the re-rolling of the negative electrode was changed to 9 μm.

Comparative Example 5

A lithium ion secondary battery was produced in the same manner as in Example 1 except for the use of aluminum oxide particles with a mean particle size of 1.0 μm and a BET specific surface area of 5.0 m²/g for forming a heat-resistant layer slurry instead of the magnesium oxide particles.

Comparative Example 6

A lithium ion secondary battery was produced in the same manner as in Example 1 except for the use of aluminum oxide particles with a mean particle size of 2.5 μm and a BET specific surface area of 2.0 m²/g for forming a heat-resistant layer slurry instead of the magnesium oxide particles.

Comparative Example 7

A lithium ion secondary battery was produced in the same manner as in Example 1 except that aluminum oxide particles with a mean particle size of 2.5 μm and a BET specific surface area of 2.0 m²/g were used for forming a heat-resistant layer slurry instead of the magnesium oxide particles and that the thickness of the porous heat-resistant layer after the re-rolling of the negative electrode was changed to 7.5 μm.

Comparative Example 8

A lithium ion secondary battery was produced in the same manner as in Comparative Example 5 except that the negative electrode whose thickness was increased by the formation of the porous heat-resistant layer was not re-rolled.

[Evaluation]

The batteries of Examples 1 to 4 and Comparative Examples 1 to 8 were evaluated as follows. Table 1 shows the evaluation results together with the active material density of the negative electrode mixture layer and the porosity of the porous heat-resistant layer after the re-rolling of the negative electrode, and the surface condition of the reduction rolls used for re-rolling the negative electrode.

(Insertion into Battery Case)

In producing batteries excluding those of Comparative Examples 3, 4 and 7, whether or not the electrode assembly could be smoothly inserted into the battery case was evaluated.

(2 C Discharge Characteristics)

The respective batteries were preliminarily charged and discharged twice and stored in a 40° C. environment for 2 days. These batteries were then charged and discharged in the following pattern to determine the 2 C discharge capacity at 0° C.

(1) Constant current charge (20° C.): 0.7 CmA (cut-off voltage 4.2 V)
(2) Constant voltage charge (20° C.): 4.2 V (cut-off current 0.05 CmA)
(3) Constant current discharge (0° C.): 2.0 CmA (cut-off voltage 3 V)

Herein, the nominal capacity (2 Ah) of the batteries was 1 CmAh.

Thereafter, the batteries were charged and discharged in the following pattern to determine the 2 C discharge capacity at 20° C.

(1) Constant current charge (20° C.): 0.7 CmA (cut-off voltage 4.2 V)
(2) Constant voltage charge (20° C.): 4.2 V (cut-off current 0.05 CmA)
(3) Constant current discharge (20° C.): 2.0 CmA (cut-off voltage 3 V)

The percentage of the 2 C discharge capacity at 0° C. relative to the 2 C discharge capacity at 20° C. was obtained.

(Safety)

After the evaluation of charge/discharge characteristics, the batteries were charged in a 20° C. environment under the following conditions.

(1) Constant current charge (20° C.): 0.7 CmA (cut-off voltage 4.25 V)
(2) Constant voltage charge (20° C.): 4.25 V (cut-off current 0.05 CmA)

In a 20° C. environment, a 2.7-mm-diameter iron round nail was caused to penetrate each charged battery from a side face thereof at a speed of 5 mm/second, and the temperature of the battery near the penetrated site was measured after 90 seconds. Table 1 shows the results.

TABLE 1

| | A.M.D (g/ml) | D50 (μm) | BET (m²/g) | Thickness (μm) | Porosity (%) | Roll surface | Insertion into battery case | 2 C discharge 0° C./20° C. (%) | Battery temperature upon nail penetration (° C.) |
|---|---|---|---|---|---|---|---|---|---|
| Example 1 | 1.8 | 1.0 | 11.5 | 3.0 | 52 | Not scratched | Good | 88 | 96 |
| Example 2 | 1.8 | 0.5 | 14.8 | 3.0 | 60 | Not scratched | Good | 92 | 92 |
| Example 3 | 1.8 | 1.5 | 8.6 | 3.0 | 42 | Not scratched | Good | 85 | 89 |
| Example 4 | 1.8 | 2.0 | 3.5 | 3.0 | 32 | Not scratched | Good | 81 | 88 |
| Comp. example 1 | 1.8 | 2.5 | 2.7 | 3.0 | 24 | Not scratched | Good | 65 | 95 |
| Comp. example 2 | 1.8 | 3.0 | 2.5 | 3.0 | 20 | Not scratched | Good | 30 | 92 |
| Comp. example 3 | 1.8 | 2.5 | 2.7 | 7.5 | 26 | Not scratched | — | 62 | 93 |
| Comp. example 4 | 1.8 | 3.0 | 2.5 | 9.0 | 21 | Not scratched | — | 32 | 93 |

TABLE 1-continued

| | A.M.D (g/ml) | D50 (μm) | BET (m²/g) | Thickness (μm) | Porosity (%) | Roll surface | Insertion into battery case | 2 C discharge 0° C./20° C. (%) | Battery temperature upon nail penetration (° C.) |
|---|---|---|---|---|---|---|---|---|---|
| Comp. example 5 | 1.8 | 1.0 | 5.0 | 3.0 | 53 | Scratched | Good | 88 | 89 |
| Comp. example 6 | 1.8 | 2.5 | 2.0 | 3.0 | 40 | Scratched | Good | 81 | 90 |
| Comp. example 7 | 1.8 | 2.5 | 2.0 | 7.5 | 40 | Scratched | — | 83 | 89 |
| Comp. example 8 | 1.7 | 1.0 | 5.0 | 3.0 | 53 | Not scratched | Difficult | 87 | 95 |

A.M.D: Active material density

Example 5

A lithium ion secondary battery was produced in the same manner as in Example 2 except that the thickness of the porous heat-resistant layer after the re-rolling of the negative electrode was changed to 0.8 μm.

Example 6

A lithium ion secondary battery was produced in the same manner as in Example 2 except that the thickness of the porous heat-resistant layer after the re-rolling of the negative electrode was changed to 1 μm.

Example 7

A lithium ion secondary battery was produced in the same manner as in Example 2 except that the thickness of the porous heat-resistant layer after the re-rolling of the negative electrode was changed to 2 μm.

Example 8

A lithium ion secondary battery was produced in the same manner as in Example 2 except that the thickness of the porous heat-resistant layer after the re-rolling of the negative electrode was changed to 4 μm.

Example 9

A lithium ion secondary battery was produced in the same manner as in Example 2 except that the thickness of the porous heat-resistant layer after the re-rolling of the negative electrode was changed to 5 μm.

Example 10

A lithium ion secondary battery was produced in the same manner as in Example 2 except that the thickness of the porous heat-resistant layer after the re-rolling of the negative electrode was changed to 6 μm.

The batteries of Examples 5 to 10 were evaluated for their 2 C discharge characteristics and safety in the same manner as in the above. Table 2 shows the results.

TABLE 2

| | A.M.D (g/ml) | D50 (μm) | BET (m²/g) | Thickness (μm) | Porosity (%) | 2 C discharge 0° C./20° C. (%) | Battery temperature upon nail penetration (° C.) |
|---|---|---|---|---|---|---|---|
| Example 5 | 1.8 | 0.5 | 14.8 | 0.8 | 59 | 91 | 105 |
| Example 6 | 1.8 | 0.5 | 14.8 | 1.0 | 58 | 90 | 96 |
| Example 7 | 1.8 | 0.5 | 14.8 | 2.0 | 59 | 90 | 92 |
| Example 8 | 1.8 | 0.5 | 14.8 | 4.0 | 57 | 90 | 94 |
| Example 9 | 1.8 | 0.5 | 14.8 | 5.0 | 60 | 84 | 86 |
| Example 10 | 1.8 | 0.5 | 14.8 | 6.0 | 57 | 76 | 89 |

A.M.D: Active material density

Examples 11 and 12 and Comparative Examples 9 and 10

Lithium ion secondary batteries of Examples 11 and 12 and Comparative Examples 9 and 10 were produced in the same manner as in Example 1 except that the BET specific surface area of the magnesium oxide particles was changed to 3.5 m²/g, 14.8 m²/g, 2.7 m²/g, and 18.0 m²/g, respectively.

The batteries of Examples 11 and 12 and Comparative Examples 9 and 10 were evaluated for their 2 C discharge characteristics and safety in the same manner as in the above. Table 3 shows the results.

TABLE 3

|  | A.M.D (g/ml) | D50 (μm) | BET (m²/g) | Porosity (%) | 2 C discharge 0° C./20° C. (%) | Battery temperature upon nail penetration (° C.) |
|---|---|---|---|---|---|---|
| Comp. example 9 | 1.8 | 2.5 | 2.7 | 24 | 65 | 95 |
| Example 11 | 1.8 | 2.0 | 3.5 | 32 | 81 | 88 |
| Example 12 | 1.8 | 0.5 | 14.8 | 60 | 92 | 92 |
| Comp. example 10 | 1.8 | 0.3 | 18.0 | 80 | 87 | 108 |

A.M.D: Active material density

Examples 13 to 18

Lithium ion secondary batteries of Examples 13 to 18 were produced in the same manner as in Example 1 except that the heat-resistant layer slurry was prepared by varying the amount of binder to 0.8, 1, 2, 4, 5, and 6 parts by weight, respectively, per 100 parts by weight of the magnesium oxide particles.

The batteries of Examples 13 to 18 were evaluated for their 2 C discharge characteristics and safety in the same manner as in the above. Table 4 shows the results.

TABLE 4

|  | Amount of binder (part by weight) | A.M.D (g/ml) | D50 (μm) | BET (m²/g) | Porosity (%) | 2 C discharge 0° C./20° C. (%) | Battery temperature upon nail penetration (° C.) |
|---|---|---|---|---|---|---|---|
| Example 13 | 0.8 | 1.8 | 1.0 | 11.5 | 40 | 82 | 110 |
| Example 14 | 1.0 | 1.8 | 1.0 | 11.5 | 49 | 85 | 95 |
| Example 15 | 2.0 | 1.8 | 1.0 | 11.5 | 51 | 87 | 92 |
| Example 16 | 4.0 | 1.8 | 1.0 | 11.5 | 52 | 89 | 90 |
| Example 17 | 5.0 | 1.8 | 1.0 | 11.5 | 50 | 86 | 88 |
| Example 18 | 6.0 | 1.8 | 1.0 | 11.5 | 42 | 82 | 105 |

A.M.D: Active material density

Examples 19 to 25 and Comparative Examples 11 and 12

Lithium ion secondary batteries of Examples 19 to 25 were produced in the same manner as in Example 1 except that the porosity of the porous heat-resistant layer after the re-rolling of the negative electrode was varied to 30, 35, 40, 55, 60, 70, and 73, respectively, by varying the mean particle size, BET specific surface area and shape of the magnesium oxide particles.

Also, lithium ion secondary batteries of Comparative Examples 11 and 12 were produced in the same manner as in Example 1 except that the porosity of the porous heat-resistant layer after the re-rolling of the negative electrode was varied to 28% and 80%, respectively, by varying the mean particle size and BET specific surface area of the magnesium oxide particles.

The batteries of Examples 19 to 25 and Comparative Examples 11 and 12 were evaluated for their 2 C discharge characteristics and safety in the same manner as in the above. Table 5 shows the results.

TABLE 5

|  | A.M.D (g/ml) | D50 (μm) | BET (m²/g) | Porosity (%) | 2 C discharge 0° C./20° C. (%) | Battery temperature upon nail penetration (° C.) |
|---|---|---|---|---|---|---|
| Comp. example 11 | 1.8 | 2.3 | 2.8 | 28 | 40 | 93 |
| Example 19 | 1.8 | 2.0 | 3.2 | 30 | 80 | 89 |
| Example 20 | 1.8 | 1.8 | 6.0 | 35 | 84 | 90 |
| Example 21 | 1.8 | 1.4 | 8.2 | 40 | 86 | 91 |
| Example 22 | 1.8 | 0.8 | 12.0 | 55 | 88 | 90 |
| Example 23 | 1.8 | 0.5 | 14.8 | 60 | 92 | 92 |
| Example 24 | 1.8 | 0.5 | 14.3 | 70 | 91 | 92 |
| Example 25 | 1.8 | 0.5 | 14.9 | 73 | 92 | 120 |
| Comp. example 12 | 1.8 | 0.3 | 18.0 | 80 | 87 | 103 |

A.M.D: Active material density

[Consideration]
(Mean Particle Size of Magnesium Oxide Particles and Porosity)

Comparative Examples 1 and 2 with mean particle sizes of magnesium oxide particles of more than 2 μm exhibited good safety. However, they exhibited a voltage drop in an early stage of the high rate discharge (2 C discharge) at low temperature (0° C.), and the discharge was almost impossible. This is probably because due to their large mean particle sizes, the load applied per one particle upon re-rolling was large. When the particles are unable to withstand the load and become cracked, the cracked fine particles are filled among the particles, thereby resulting in a significant decrease in porosity. This tendency becomes evident when the mean particle size of the magnesium oxide particles exceeds 2 μm. As the mean particle size of the magnesium oxide particles decreased, the porosity of the porous heat-resistant layer increased. As a result, the 2 C discharge characteristics at low temperature were improved.

When aluminum oxide was used in place of magnesium oxide, relatively good characteristics were obtained, but innumerable minute scratches were made on the surfaces of the reduction rolls upon re-rolling. This is because the hardness of aluminum oxide is higher than that of magnesium oxide.

Even when the mean particle size of the magnesium oxide was 0.5 μm, by controlling the shape of the particles, porous heat-resistant layers with high porosities were obtained (Examples 24 and 25). In this case, even when the porosity was 70%, safety was ensured, but when it was 73%, the battery temperature after the nail penetration was high.

(Thickness of Porous Heat-Resistant Layer)

When the thickness of the porous heat-resistant layer was 0.8 μM (Example 5), the battery temperature upon nail penetration, which serves as a safety index, was slightly high, but not as high as abnormal heating. Also, since the porous heat-resistant layer was thin, the 2 C discharge characteristics at low temperature were good. When the thickness of the porous heat-resistant layer was 6.0 μm (Example 10), the 2 C discharge characteristics at low temperature degraded despite the high porosity. This is because the porous heat-resistant layer served as resistance.

However, this degradation in 2 C discharge characteristics is not so large and thus causes no problem.

(BET Specific Surface Area of Magnesium Oxide)

The BET specific surface area of the magnesium oxide is correlated with the mean particle size. When the BET specific surface area was 2.7 m²/g (Comparative Example 1), the mean particle size was more than 2.0 μm. Thus, the porosity lowered and the 2 C discharge characteristics at low temperature were unsatisfactory. On the other hand, when the BET specific surface area was more than 15 m²/g, the mean particle size was less than 0.5 μm. Thus, the porosity became 80%, which is excessively high, and the safety degraded.

(Amount of Binder (PVDF) in Porous Heat-Resistant Layer)

When the amount of binder per 100 parts by weight of magnesium oxide was adjusted to less than 1 part by weight, the battery temperature upon nail penetration, which serves as a safety index, was high, and the battery was heated to a relatively high temperature of about 100° C. This is because the amount of binder was small and therefore the porous heat-resistant layer became partially separated from the negative electrode during the fabrication of the electrode assembly. The separation of the porous heat-resistant layer was particularly evident near the edges of the negative electrode. When the amount of binder per 100 parts by weight of magnesium oxide was adjusted to more than 5 parts by weight, the negative electrode with such a porous heat-resistant layer had high hardness. Thus, during the fabrication of the electrode assembly, innumerable cracks were made in the porous heat-resistant layer and separation occurred.

Examples 26 to 28

Lithium ion secondary batteries of Examples 26 to 28 were produced in the same manner as in Example 1 except that the heat-resistant layer slurry was prepared by using 1, 3, and 5 parts by weight, respectively, of rubber particles (BM400B available from Zeon Corporation) per 100 parts by weight of magnesium oxide instead of PVDF.

The batteries of Examples 26 to 28 were evaluated for their 2 C discharge characteristics and safety in the same manner as in the above. Table 6 shows the results.

TABLE 6

| | Rubber particles | Amount of binder (Part by weight) | A.M.D (g/ml) | D50 (μm) | BET (m²/g) | Porosity (%) | 2 C discharge 0° C./20° C. (%) | Battery temperature upon nail penetration (° C.) |
|---|---|---|---|---|---|---|---|---|
| Example 26 | BM400B | 1.0 | 1.8 | 1.0 | 11.5 | 53 | 90 | 88 |
| Example 27 | BM400B | 3.0 | 1.8 | 1.0 | 11.5 | 51 | 87 | 89 |
| Example 28 | BM400B | 5.0 | 1.8 | 1.0 | 11.5 | 47 | 82 | 88 |

A.M.D: Active material density

In Table 6, the evaluation results of Examples 26 to 28 were equivalent to those of Examples 14 to 17. This indicates that the effects of the present invention can be obtained regardless of the kind of the binder contained in the porous heat-resistant layer.

Example 29

A lithium ion secondary battery was produced in the same manner as in Example 1 except that the thickness of the porous heat-resistant layer after the re-rolling of the negative electrode was changed to 15 μm and that no separator was used.

Example 30

A lithium ion secondary battery was produced in the same manner as in Example 29 except that the mean particle size of the magnesium oxide particles was changed to 0.5 μm (BET specific surface area: 14.8 m²/g).

Example 31

A lithium ion secondary battery was produced in the same manner as in Example 29 except that the mean particle size of the magnesium oxide particles was changed to 1.5 μm (BET specific surface area: 8.6 m²/g).

Example 32

A lithium ion secondary battery was produced in the same manner as in Example 29 except that the mean particle size of the magnesium oxide particles was changed to 2 μm (BET specific surface area: 3.5 m²/g).

Comparative Example 13

A lithium ion secondary battery was produced in the same manner as in Example 29 except that the mean particle size of the magnesium oxide particles was changed to 2.5 μM (BET specific surface area: 2.7 m²/g).

Comparative Example 14

A lithium ion secondary battery was produced in the same manner as in Example 29 except that the mean particle size of the magnesium oxide particles was changed to 3 μm (BET specific surface area: 2.5 m²/g).

The batteries of Examples 29 to 32 and Comparative Examples 13 and 14 were evaluated for their 2 C discharge characteristics and safety in the same manner as in the above. Table 7 shows the results.

TABLE 7

|  | A.M.D (g/ml) | D50 (μm) | BET (m²/g) | Thickness (μm) | Porosity (%) | 2 C discharge 0° C./20° C. (%) | Battery temperature upon nail penetration (° C.) |
|---|---|---|---|---|---|---|---|
| Example 29 | 1.8 | 1.0 | 11.5 | 15 | 50 | 86 | 94 |
| Example 30 | 1.8 | 0.5 | 14.8 | 15 | 59 | 89 | 95 |
| Example 31 | 1.8 | 1.5 | 8.6 | 15 | 40 | 83 | 93 |
| Example 32 | 1.8 | 2.0 | 3.5 | 15 | 31 | 80 | 95 |
| Comp. example 13 | 1.8 | 2.5 | 2.7 | 15 | 22 | 35 | 92 |
| Comp. example 14 | 1.8 | 3.0 | 2.5 | 15 | 18 | 30 | 97 |

A.M.D: Active material density

Table 7 indicates that the use of a thick porous heat-resistant layer in place of the separator can produce a peculiarly good result when the mean particle size of the magnesium oxide particles is in the range of 0.5 to 2 μm.

The present invention is particularly useful for non-aqueous electrolyte secondary batteries that are required to provide high energy density. The present invention is particularly useful for non-aqueous electrolyte secondary batteries that are required to offer good discharge characteristics and safety. The present invention is also effective for reducing the costs necessary for manufacturing facilities.

The present invention is applicable to various non-aqueous electrolyte secondary batteries, and applicable examples include non-aqueous electrolyte secondary batteries that serve as power sources for driving commercial electronic devices and portable appliances such as personal digital assistants, portable electronic appliances, and cordless appliances. The present invention is also applicable to power sources for domestic small-sized power storage devices, two-wheel motor vehicles, electric vehicles, hybrid electric vehicles, etc.

The battery shape is not particularly limited, and the present invention is applicable to any shape, such as coin, button, sheet, cylindrical, flat, or rectangular type. Also, the type of the electrode assembly is not limited, and the present invention is applicable to any type, for example, a wound or laminated type. Further, the battery size is not limited, and the present invention is applicable to any size, such as small, medium, or large.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising a positive electrode, a negative electrode, a separator interposed between said positive electrode and said negative electrode, a porous heat-resistant layer interposed between said positive electrode and said negative electrode, and a non-aqueous electrolyte, said positive and negative electrodes being wound with said separator and said porous heat-resistant layer, said negative electrode comprising a negative electrode current collector and a negative electrode mixture layer on a surface of said negative electrode current collector, said negative electrode mixture layer having an active material density of 1.5 g/ml to 1.8 g/ml, said porous heat-resistant layer being carried on said negative electrode, and said porous heat-resistant layer comprising magnesium oxide particles having a mean particle size of 0.5 μm to 2 μm, wherein said porous heat-resistant layer contains 1 to 5 parts by weight of a binder per 100 parts by weight of said magnesium oxide particles, and said porous heat-resistant layer has a thickness of 1 μm to 5 μm.

2. A non-aqueous electrolyte secondary battery comprising a positive electrode, a negative electrode, a porous heat-resistant layer interposed between said positive electrode and said negative electrode, and a non-aqueous electrolyte, said positive and negative electrodes being wound with said porous heat-resistant layer, said negative electrode comprising a negative electrode current collector and a negative electrode mixture layer on a surface of said negative electrode current collector, said negative electrode mixture layer having an active material density of 1.5 g/ml to 1.8 g/ml, said porous heat-resistant layer being carried on said negative electrode, and said porous heat-resistant layer comprising magnesium oxide particles having a mean particle size of 0.5 μm to 2 μm, wherein a separator is not provided between said positive electrode and said negative electrode, said porous heat-resistant layer contains 1 to 5 parts by weight of a binder per 100 parts by weight of said magnesium oxide particles, and said porous heat-resistant layer has a thickness of 2 μm to 15 μm.

3. The non-aqueous electrolyte secondary battery in accordance with claim 1, wherein said magnesium oxide particles have a BET specific surface area of 3 $m^2/g$ to 15 $m^2/g$.

4. The non-aqueous electrolyte secondary battery in accordance with claim 1, wherein said porous heat-resistant layer has a porosity of 30% to 70%.

5. The non-aqueous electrolyte secondary battery in accordance with claim 2, wherein said magnesium oxide particles have a BET specific surface area of 3 $m^2/g$ to 15 $m^2/g$.

6. The non-aqueous electrolyte secondary battery in accordance with claim 2, wherein said porous heat-resistant layer has a porosity of 30% to 70%.

* * * * *